US007836013B2

(12) United States Patent
Motosugi et al.

(10) Patent No.: US 7,836,013 B2
(45) Date of Patent: Nov. 16, 2010

(54) DATA TRANSMISSION APPARATUS INCORPORATING KEY THAT SPECIFIES RECIPIENT AND SYSTEM THEREFOR

(75) Inventors: Toshihisa Motosugi, Okazaki (JP); Akira Ohhata, Aichi-ken (JP); Takuya Okada, Toyokawa (JP); Yoichi Kurumasa, Toyokawa (JP); Ryotaro Iwase, Kawasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 236 days.

(21) Appl. No.: 10/951,874

(22) Filed: Sep. 29, 2004

(65) Prior Publication Data

US 2005/0192945 A1 Sep. 1, 2005

(30) Foreign Application Priority Data

Mar. 1, 2004 (JP) .............................. 2004-056405

(51) Int. Cl.
*G06F 7/00* (2006.01)
(52) U.S. Cl. ...................... 707/610; 707/770; 707/758; 707/694
(58) Field of Classification Search ................. 707/610, 707/694, 758, 770
See application file for complete search history.

(56) References Cited

U.S. PATENT DOCUMENTS

| 2002/0073065 | A1* | 6/2002 | Inaba et al. ..................... 707/1 |
| 2005/0044108 | A1* | 2/2005 | Shah et al. ................ 707/104.1 |
| 2007/0112742 | A1* | 5/2007 | Dumais et al. .................. 707/3 |

FOREIGN PATENT DOCUMENTS

| JP | 4-24139 | 2/1992 |
| JP | 5-114986 | 5/1993 |
| JP | 06-243170 A | 9/1994 |
| JP | 11-068914 | 3/1999 |
| JP | 2001-249882 | 9/2001 |
| JP | 2002-197100 A | 7/2002 |
| JP | 2002-232663 | 8/2002 |
| JP | 2002-344686 A | 11/2002 |
| JP | 2003-085174 A | 3/2003 |
| JP | 2003-114898 A | 4/2003 |
| JP | 2003-189075 A | 7/2003 |

* cited by examiner

OTHER PUBLICATIONS

Japanese Office Action directed at counterpart application 2004-56405 mailed on Sep. 16, 2008; 7 pages.

*Primary Examiner*—Pierre M Vital
*Assistant Examiner*—Christopher J Raab
(74) *Attorney, Agent, or Firm*—Morrison & Foerster LLP (57) ABSTRACT

A data transmission system in which a registration server on which recipient information is registered is connected over a network to a data transmission apparatus that transmits data to a recipient, comprising: the registration server, comprising, a database in which information including recipient information is registered, a search portion that searches the registered information using search parameter, and a communication portion that outputs the recipient information resulting from the search by the search portion to the data transmission apparatus; the data transmission apparatus, comprising: a storage portion that deems recipient information sent from the registration server to represent a recipient and stores the recipient information in association with a recipient designation key, a display portion that displays a recipient setting screen that displays the recipient designation keys stored in the storage portion, and a transmission portion that transmits data to the recipient corresponding to a selected recipient designation key; wherein the registration server or the data transmission apparatus has a search parameter value storage portion that stores the search parameter.

12 Claims, 10 Drawing Sheets

DATA TRANSMISSION APPARATUS INCORPORATING KEY THAT SPECIFIES RECIPIENT AND SYSTEM THEREFOR

This application is based on Japanese Patent Application No. 2004-056405 filed in Japan on Mar. 1, 2004, the entire content of which is hereby incorporated by reference.

BACKGROUND OF THE INVENTION

1. Field of the Invention

The present invention relates to data communication over a network via a data transmission apparatus that includes keys that each specify a transmission destination.

2. Description of the Related Art

Modern computers and network devices can send scanned text and image data over the Internet fax or directly to a computer in a network environment. When sending such data via e-mail or the like, the e-mail address of the recipient must be input, but the input operation using an operation panel or the like is cumbersome, and errors commonly occur, resulting in the e-mail not being received as intended. Consequently, a system has been developed in which whereby a server that manages an address book in which recipient addresses are recorded is accessed from a personal computer or network device (such as an MFP) and the desired recipient is sought using keywords and designated as the recipient of an e-mail. However, this system entails the problem that it is time-consuming to access the address book management server, search for an address and specify the address as the e-mail recipient each time an e-mail is to be sent.

With a one-touch dial feature, common on facsimile machines, when a recipient telephone number that is manually input once is registered as a one-touch dialing number, the recipient can be specified the next time in a single operation via one-touch dialing (see Japanese Laid-Open Patent Application H11-68914). The one-touch dial feature simplifies the recipient setting process and eliminates the need to repeat the cumbersome manual entry process each time a number is dialed. In the system described in Japanese Laid-Open Patent Application 2002-232663, a one-touch/abbreviated/group dial information database resides in the network database. The computer user can register, change or delete one-touch/abbreviated/group dial information by accessing this database.

In the network system described in Japanese Laid-Open Patent Application 2001-249882, the addressees contained in the address books for all devices connected to the network (such as the server and an MFP) are synchronized periodically, for example. Alternatively, the address book data is maintained on a file server and shared within the system.

In the network described in Japanese Laid-Open Patent Application 2002-232663, a one-touch/abbreviated/group dial information database is stored on a database server. A computer user registers, changes or deletes one-touch/abbreviated/group dial information by accessing this database. Each time this is done, the database information is updated, and the facsimile machine, for example, periodically accesses the database, and if the database information is changed, updates the information registered to the corresponding one-touch keys in the facsimile machine.

Where the devices connected to the network each have an associated address book, if the contents of each address book are not updated, communication may be impossible. Accordingly, in the network system described in Japanese Laid-Open Patent Application 2001-249882, the names in the address books for each of the various devices connected to the network are synchronized periodically, for example.

In the facsimile machine described in Japanese Laid-Open Patent Application H11-68914, communication errors caused by a one-touch dialing error are prevented. For example, where the other party does not accept a call via a fax number registered with a one-touch key, a warning is issued to the user. This prevents unused one-touch numbers from remaining registered indefinitely. However, if the warning is ignored, there is no improvement in the situation. Where a one-touch dialing function is present, when a fax number or other number is changed, if the numbers registered for one-touch dialing are not updated accordingly, connection via one-touch dialing becomes impossible. Therefore, it becomes necessary to once more manually input the number for one-touch dialing.

In the network described in Japanese Laid-Open Patent Application 2002-232663, the computer user can register, change or delete one-touch/abbreviated/group dial information by accessing the database containing such information on the database server. The facsimile machine periodically accesses the database, for example, and if the database information is changed, updates the information registered to the corresponding one-touch keys in the facsimile machine. However, when the user specifies a recipient using a one-touch key, the registered number for that key may have already been changed. Therefore, the information registered for one-touch keys must always be updated with the latest information.

Furthermore, in these conventional technologies, because a recipient and a one-touch key have a one-to-one relationship, where all members of a certain department or section are registered, for example, if a new person is added to the department or section, because updating on a global basis is not possible, it is time-consuming to register this new person in association with a one-touch key.

OBJECT AND SUMMARY

An object of the present invention is to provide a data transmission apparatus and system that, where registration information on a recipient registration server has been updated, can maintain the information registered in connection with recipient registration keys on the data transmission apparatus in a continually updated state, or can make such maintenance easy.

The above object is achieved by providing a transmission apparatus and system having the construction described below.

A data transmission system in which a registration server on which recipient information is registered is connected over a network to a data transmission apparatus that transmits data to a recipient, comprising:

the registration server, comprising, a database in which information including recipient information is registered, a search portion that searches the registered information using search parameter, and a communication portion that outputs the recipient information resulting from the search by the search portion to the data transmission apparatus;

the data transmission apparatus, comprising; a storage portion that deems recipient information sent from the registration server to represent a recipient and stores the recipient information in association with a recipient designation key, a display portion that displays a recipient setting screen that displays the recipient designation keys stored in the storage portion, and a transmission portion that transmits data to the recipient corresponding to a selected recipient designation key; wherein the registration server or the data transmission apparatus has a search parameter value storage portion that stores the search parameter.

It is preferred that when the recipient information registered in the database is updated, the registration server once more perform a re-search of the database using the search parameter stored in the search parameter value storage portion and send the recipient information resulting from the re-search to the data transmission apparatus.

It is furthermore preferred that the data transmission apparatus deems recipient information sent from the registration server to represent the recipient and registers the recipient information in association with the recipient designation key and store the recipient information in the storage portion.

It is furthermore preferred that the display portion of the data transmission apparatus displays a search parameter setting screen by which to set the search parameter.

It is furthermore preferred that the search parameter value storage portion is incorporated in the data transmission apparatus.

It is furthermore preferred that the registration server output an update notification from the communication portion when recipient information registered in the database is updated.

If is furthermore preferred that the data transmission apparatus output a search instruction to the registration server instructing that the database be re-searched using the search parameter stored in the search parameter value storage portion when the update notification is received.

It is furthermore preferred that the registration server carry out the re-search of the database using the search parameter based on the search instruction output from the data transmission apparatus, and send to the data transmission apparatus the recipient information resulting from the re-search.

It is furthermore preferred that if a plurality of recipient information are sent from the registration server, the data transmission apparatus deem the plurality of the recipient information to represent a recipient and registers the recipient information in association with recipient designation key and store it in the storage portion, as well as store the plurality of recipient information as recipient group information.

It is furthermore preferred that the data transmission apparatus display the recipient group information on the recipient setting screen, and when the recipient group information is selected, display the search parameter stored in the search parameter value storage portion.

A different aspect of the present invention comprises a data transmission apparatus connected over a network to a registration server having a database in which information including recipient information is registered, comprising: a storage portion that registers recipient information sent as the results of a search of the database using the search parameter to represent a recipient and registers the recipient information in association with a recipient designation key; a search parameter storage portion that stored the search parameter; a display portion that displays a recipient setting screen that displays the recipient designation keys stored in the storage portion; and a transmission portion that transmits data to the recipient corresponding to a selected recipient designation key.

It is preferred that when an update notification indicating that information registered in the database is updated is received, the data transmission apparatus outputs to the registration server a search instruction instructing to re-search the database once more using the search parameter stored in the search parameter storage portion.

It is furthermore preferred that the recipient information comprising the results of a re-search output from the registration server in response to the search instruction be deemed to represent recipients and stored once more in the storage portion.

Yet another aspect of the present invention comprises A data transmission system in which a registration server in which recipient information is registered is connected over a network to a data transmission apparatus that transmits data to a recipient, comprising the registration server comprising a database in which information including recipient information is registered and a communication portion that when the recipient information registered in the database is updated, outputs an update notification from the communication portion;

the data transmission apparatus comprising, a storage portion that deems the recipient information sent from the registration server to represent a recipient and stores the recipient information in association with a recipient designation key, a display portion that displays a recipient setting screen that displays the recipient designation keys stored in the storage portion, a transmission portion that transmits data to the recipient corresponding to a selected recipient designation key, and a update portion that updates the recipient information stored in the storage portion;

wherein in response to the update notification output by the registration server, and the update portion obtains the updated information from the database and updates the recipient information stored in the storage portion.

Yet another aspect of the present invention comprises A data transmission apparatus that is connected over a network to a registration server containing a database in which information including recipient information is registered, the recipient apparatus comprising: a storage portion that stores a recipient in association with a recipient designation key; a display portion that displays a recipient setting screen that displays the recipient designation keys stored in the storage portion; a transmission portion that transmits data to the recipient corresponding to a selected recipient designation key, and a update portion that, in response to an update notification output by the registration server when recipient information stored in the database is updated, accesses the database and updates the recipient information stored in the storage portion.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Embodiments of the invention will be described below with reference to the attached drawings.

Figure 1:
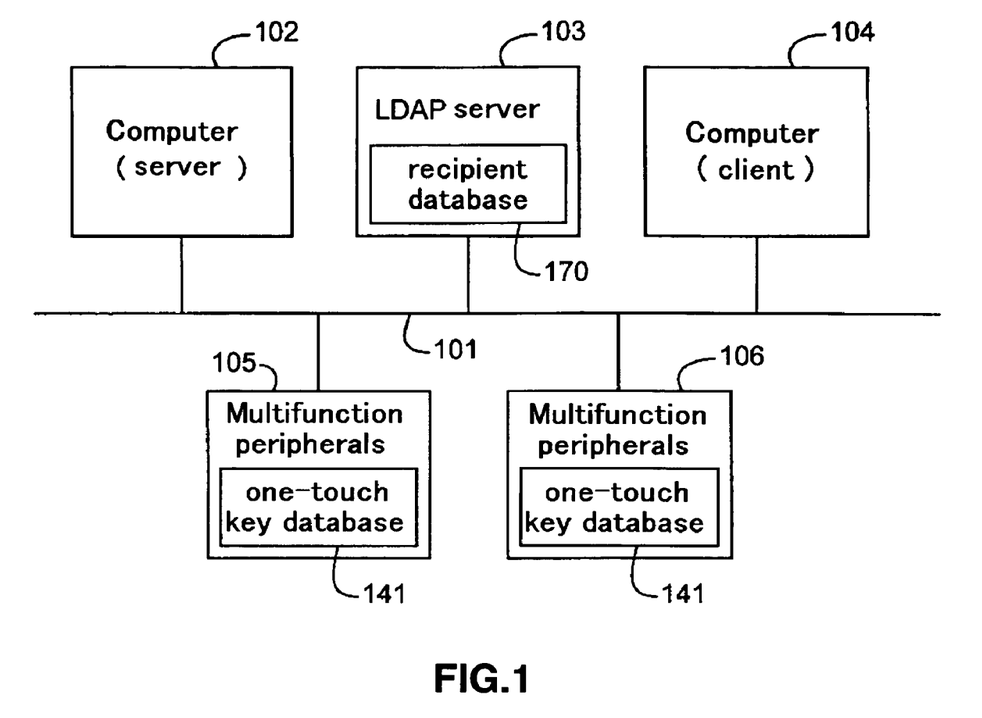
FIG. 1 is a block diagram showing the basic construction of a system.

FIG. 1 shows the construction of a system that performs data communication over a network (LAN, for example) 101. In this system, multiple network devices 102 through 106 are connected to the network 101. The computer 102 operates as a server. Address information for the recipients within the network is registered in the LDAP server 103. The LDAP server 103 is one example of a registration server in which recipient addresses are registered. The computer 104 operates as a client. Multifunction peripherals (MFPs) 105 and 106 are also connected to the network 101. The MFPs 105 and 106 are apparatuses that have multiple functions enabling them to function as image readers, facsimile machines, printers or copying machines. These MFPs are data transmission apparatuses having a function to send data to other devices over the network. The MFPs 105 and 106 can send over the network 101 image data and/or text data input from an external image reader (not shown) or data read and stored internally. The number of server computers, client computers and MFPs connected to the network is not limited to the example shown in FIG. 1. Furthermore, the types and numbers of the data transmission apparatuses and data receiving apparatuses that transmit/receive data are not limited to the example shown in FIG. 1.

Figure 2:
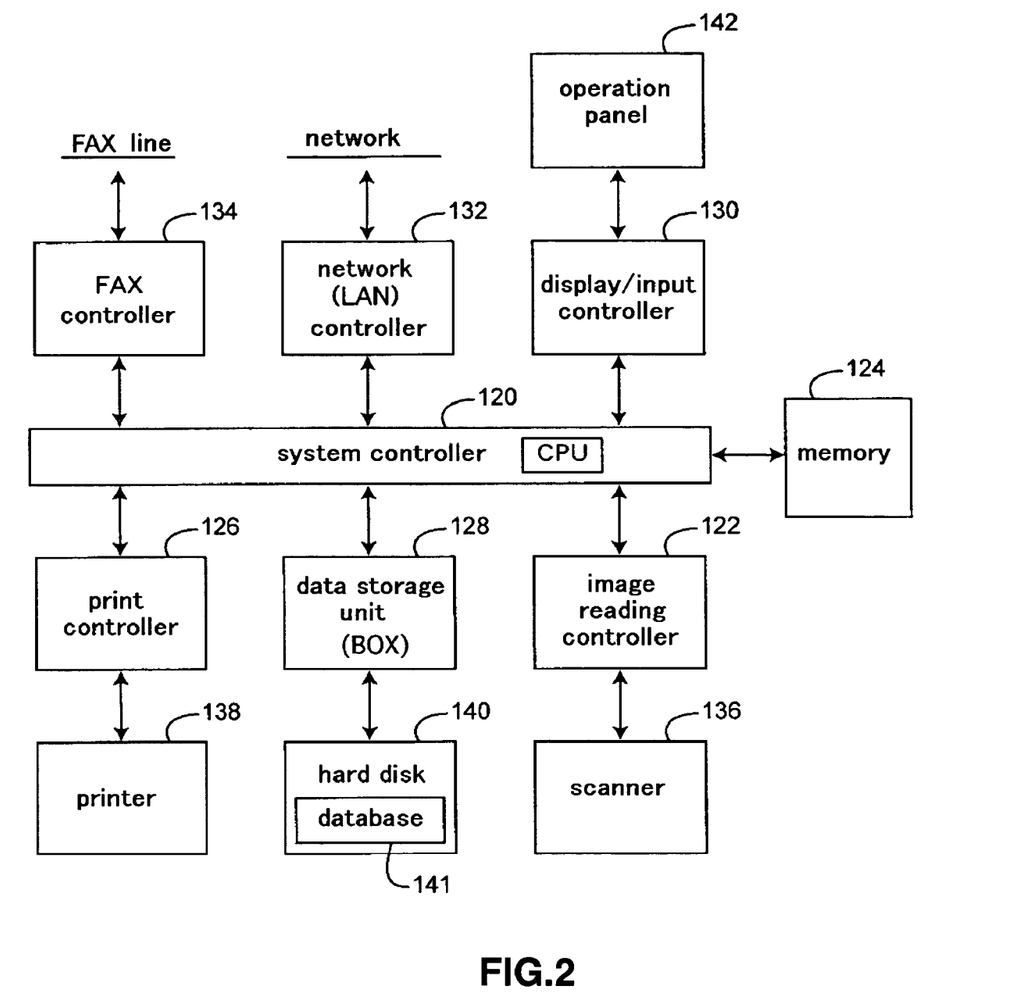
FIG. 2 is a block diagram showing the basic construction of a multifunction peripheral.

FIG. 2 is a block diagram showing the basic construction of the MFPs 105 and 106. The system controller 120 includes a CPU and controls the entire MFP. An image reading controller 122, a memory 124, a print controller 126, a data storage unit 128, a display/input controller 130, a network controller 132, and a FAX controller 134 are connected to the system controller 120. The image reading controller 122 controls image reading by the scanner 136. The print controller 126 controls the printer 138 and performs printing. The data storage unit 128 stores data on a hard disk 140. The FAX controller 134 sends and receives fax data over a FAX line. The display/input controller 130 displays various screens on an operation panel 142 and accepts various inputs from the user via the screen. The operation panel 142 is one example of display portion that displays various input screens as well as a search result display screen. The memory 124 is used as a work area in the processing for image reading or printing. The network controller 132 controls communication with the network (LAN) 101. The network controller 132 is one example of transmission portion that transmits data to a recipient corresponding to a one-touch key (recipient designation key) selected via the operation panel 142, as described below. A database (one-touch key database) 141 and a program to access the LDAP server 103 (such as a Web browser) are stored on the hard disk 140, which comprises storage portion. The database 141 is a database in which information including address information is registered. As described below, search parameter values used for searches on the LDAP server 103 are also stored on the hard disk 140.

In this system, the MFPs 105 and 106 comprising network devices can send text data and/or image data to the client computer 104 or the like as an Internet fax or as a file attached directly to an e-mail. The MFPs 105 and 106 each have one-touch keys on the operation panel 142. The one-touch keys are recipient designation keys in association with which recipient information (e-mail addresses in this embodiment) is registered, and recipient information (the recipient e-mail address, for example) can be registered in association with each one-touch key. During transmission, the user can designate a recipient e-mail address simply by pressing down a one-touch key on the panel 142, and an e-mail to which the transmission data is attached is sent to the designated e-mail address. The data for each one-touch key is stored in the database 141. The MFPs 105 and 106 store the addresses sent from the LDAP server 103 in the database 141 as information to represent recipients in association with the recipient designation keys on the operation panel 142, as described below, and can store multiple addresses as recipient group information.

The LDAP server 103 includes a database (recipient database) 170 in which recipient information (recipient e-mail addresses in this embodiment) is registered. The user enters search parameter values, accesses the LDAP server 103 over the network 101 and instructs that a search be performed. The LDAP server 103 extracts addresses from the database 170 based on the search parameter values. When the user instructs registration of the extracted data, the extracted recipient addresses are registered in the database 141 of the MFP. The search parameter values are registered at the same time. The information for each one-touch key on the operation panel 142 and the search parameter value database 141 are stored on the hard disk 140, but may be stored on other storage portion, such as any of the non-volatile memories within the MFP.

Figure 3:
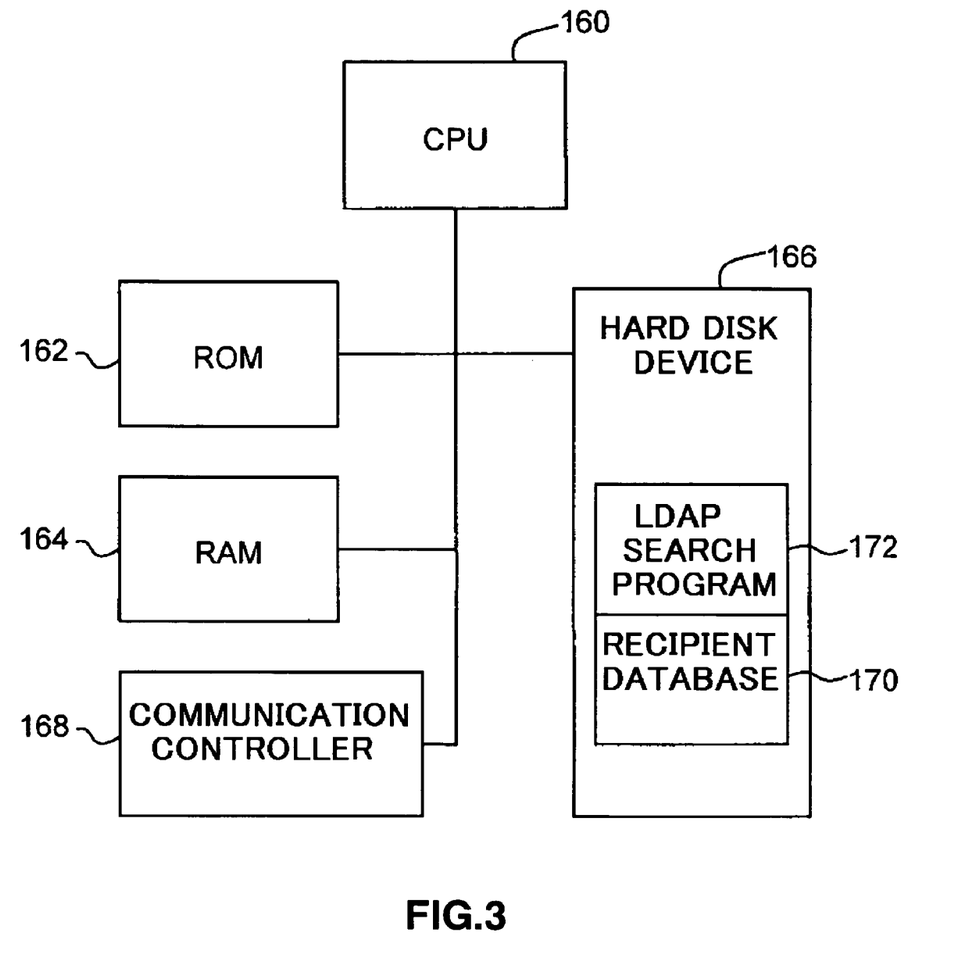
FIG. 3 is a block diagram showing the basic construction of an LDAP server.

FIG. 3 shows the basic construction of the LDAP server 103. The CPU 160 that performs overall control includes a ROM 162 that stores programs and data, a RAM 164 that serves as a work area, a hard disk device 166 that stores programs and data, and a communication controller 168 that governs communication with the external network 101. A database 170 in which information regarding recipients on the network 101 is registered, and a LDAP search program 172 that externally registers data in the database 170 over the network and searches the data are stored on the hard disk of the hard disk device 166. LDAP refers to a protocol for accessing a directory database over a TCP/IP network such as the Internet or an Intranet, and in an LDAP search, a search is performed using the LDAP protocol. Directory service refers to a service to manage information regarding the e-mail addresses and environments of users who use the network, and such information can be sought based on the user name. The search parameter values stored in the database 141 of the MFP 105 or 106 may be stored on the hard disk device 166 of the LDAP server. The LDAP search program 172 comprises search portion that searches the database 170 using the search parameter values. The communication controller 168 operates as communication portion that outputs the addresses, which comprises the results of a search, to the data transmission apparatus.

Such information as names, e-mail addresses, fax numbers and company names regarding individuals and organizations is registered in the database 170 of the LDAP server 103. The user of the MFP 105 or 106 or the computer 104 enters search parameter values, and instructs the LDAP server 103 to carry out a search over the network 101. A method may be used in which the information in the LDAP server 103 is sought based on a search condition such as 'contains', 'equals', 'begins with' or 'ends with' regarding one search keyword, or in which a search is conducted based on a search condition such as 'contains', 'equals', 'begins with' or 'ends with' regarding one search keyword for each target attribute such as the name or e-mail address, and the information is narrowed down by executing AND operations within the search results. The LDAP server 103 extracts recipient addresses from the database 170 based on the search parameter values.

In order to make changes to address information, the user accesses the database 170 in the LDAP server 103 and updates data. Each time the database 170 in the LDAP server 103 is updated, the LDAP server 103 notifies all other data transmission apparatuses (including the MFPs 105 and 106, for example) connected to the network 101. (It is also acceptable if the search results are notified to only those data transmission apparatuses that have used LDAP.) When an update notification is received from the LDAP server 103, the data transmission apparatus obtains information by searching the database 170 of the LDAP server 103 once more using the registered search parameter values where appropriate, and updates the database 141. In this way, the data in the database 141 of the data transmission apparatus is kept updated at all times.

The execution of an LDAP search will now be described. The MFP 105, which is one example of a data transmission apparatus, instructs the LDAP server 103 to carry out an LDAP search using a search keyword/search condition via the network 101, and receives the search result information from the LDAP server 103. A method may be used in which the information in the LDAP server 103 is searched based on a search condition such as 'contains', 'equals', 'begins with' or 'ends with' regarding one search keyword, or in which a search is conducted based on a search condition such as 'contains', 'equals', 'begins with' or 'ends with' regarding one search keyword for each target attribute such as the name or e-mail address, and the information is narrowed down by executing AND operations within the search results. The latter method will be explained here. The search condition can be set from the client computer 105 that uses the MFP 105.

Figure 4:
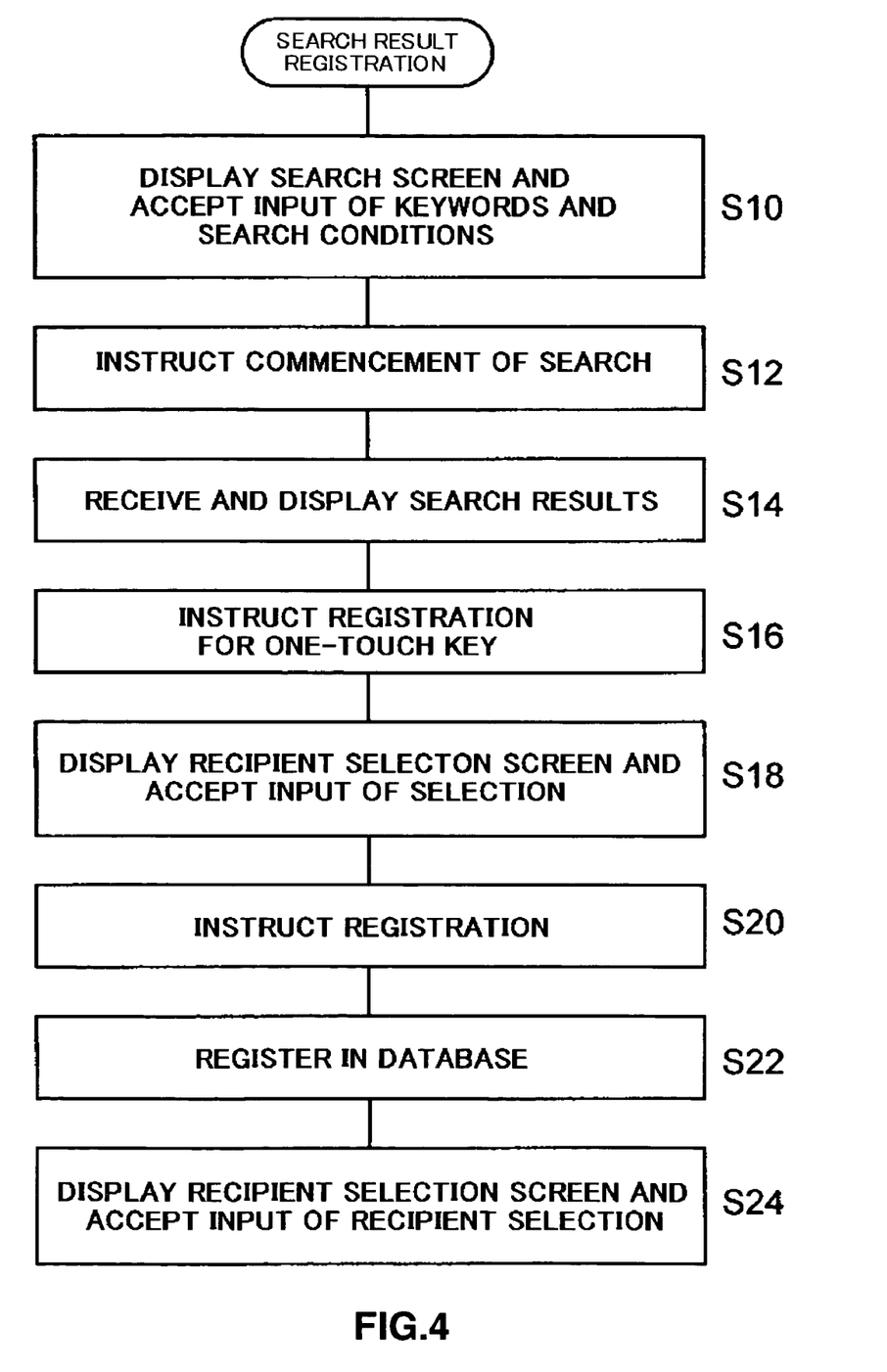
FIG. 4 is a flow chart of search registration.
Figure 5A:
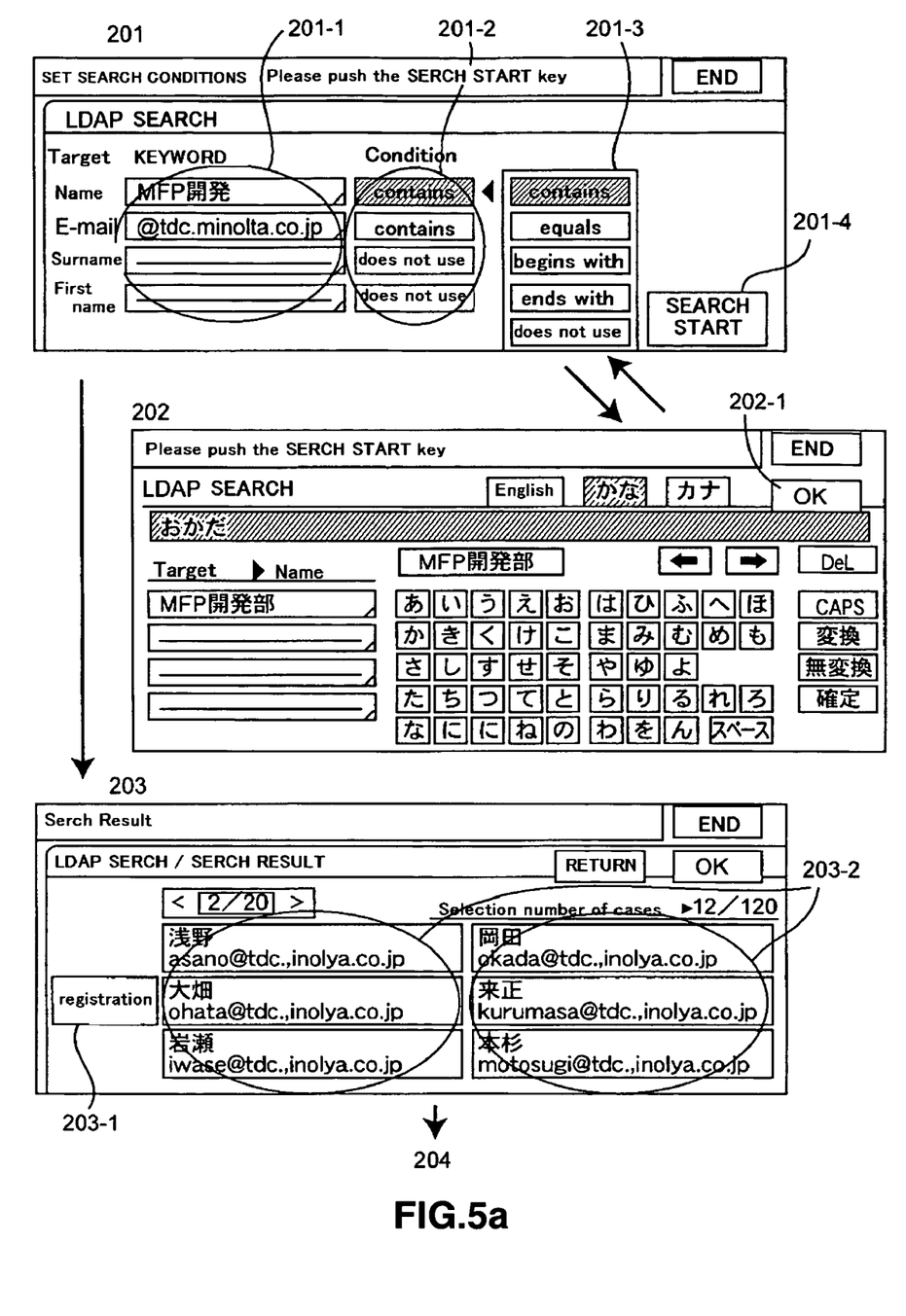
FIG. 5a shows the screen changes during an LDAP search.
Figure 5B:
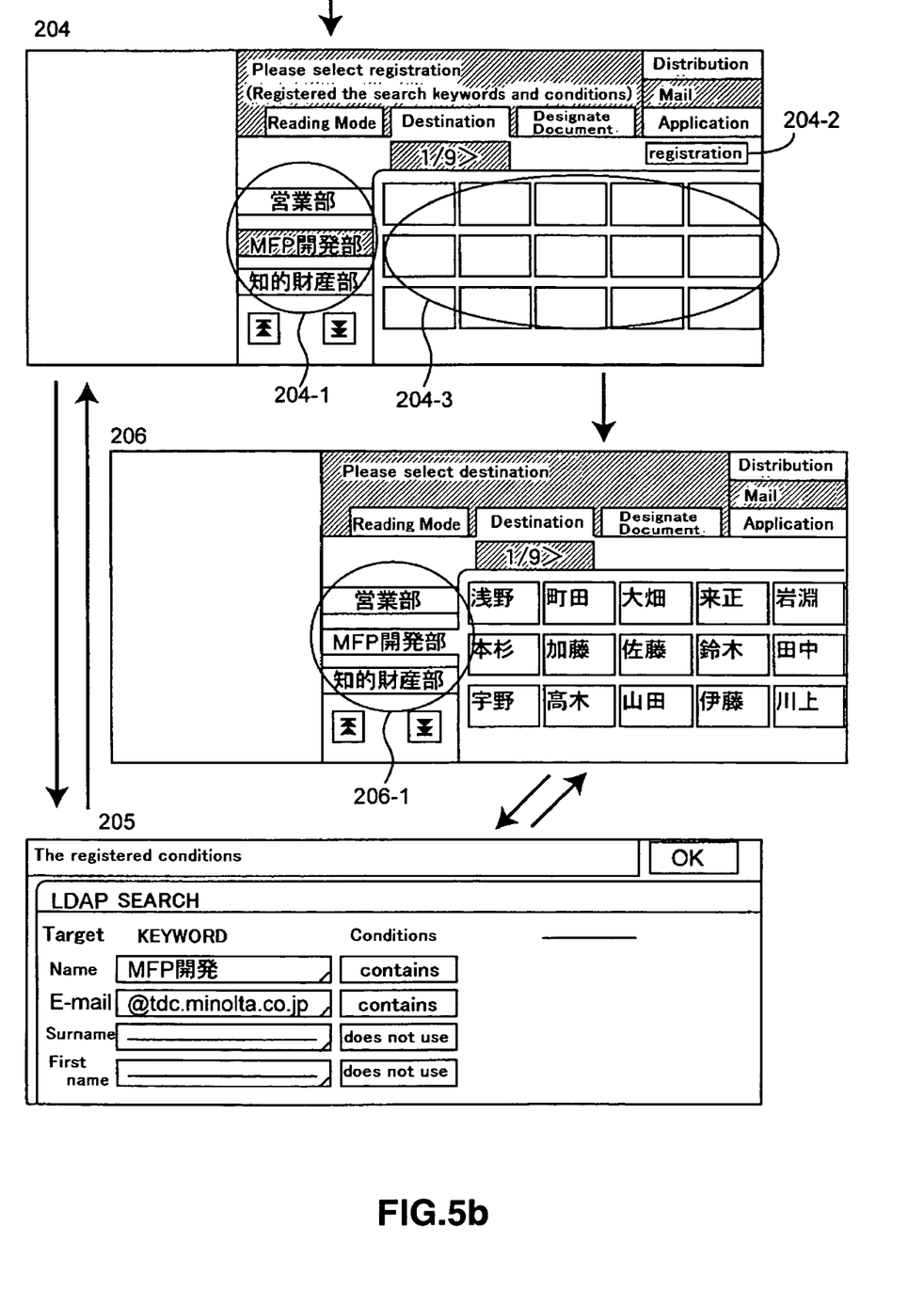
FIG. 5b shows the screen changes continuing after FIG. 5a during an LDAP search.

FIG. 4 shows the sequence of operations executed by the LDAP search program 172 when a search is performed for recipient information using the MFP panel 132 and the search results are registered as one-touch information. FIGS. 5*a* and 5*b* show the screen changes occurring during this process. When the user selects an LDAP search via a menu screen (not shown) on the MFP panel 142, a screen 201 for entering a keyword and search condition for each target attribute is displayed, and the user's input of a keyword and search condition is accepted (S10). The screen 201 is a search parameter setting screen by which to set the search parameter values regarding the data in the database 170. Displayed on the screen 201 are, from the left, 'Target', meaning the search target attribute, 'Keyword', indicating the target attribute, and 'Condition', indicating the search condition for the keyword. In this example, the target attribute can be 'Name', 'E-mail address', 'Surname', or 'First name'. The 'Name' refers to a name that expresses a group that includes multiple e-mail addresses. The target attribute choices therefore include the 'Name' for the group of one-touch keys, and the 'E-mail address', 'Surname', or 'First name' for each one-touch key. A keyword and search condition can be input via this screen 201 for each target attribute. The screen 201 also includes a search start key 201-4 by which to instruct the start of a search.

On the screen 201, by pressing down a key 200-1 corresponding to a keyword box for one target attribute, a screen 202 by which to input a search keyword is displayed. The user can input a search keyword using English, Japanese hiragana, katakana and/or Chinese characters via this screen 202. When the key 202-1 on the screen 202 is pressed, the screen 201 is displayed.

On the screen 201, by pressing down a key 201-2 corresponding to one condition box, keys 201-3 by which to select a search condition for the target attribute are displayed, thereby enabling the entry of a search condition. In this example, the search condition can be 'contains', 'equals', 'begins with', 'ends with', or 'does not use'. The search condition can be set for a one-touch key group and/or each one-touch key.

Search parameter values (or search formulae) comprising a search keyword and search condition are also registered in the one-touch key database 141 of the MFP 105 or 106. Therefore, when the search parameter setting screen 201 is displayed by selecting a one-touch key, the search keyword and search condition for that one-touch key are displayed. Where the search parameter values are not to be changed, the search can be begun by pressing the search start key 201-4 without any further operation. The information registered in the database 141 of the MFP 105 or 106 does not correspond to the information registered in the database 170 of the LDAP server on a one-to-one basis; the amount of information registered in the database 170 is normally much larger. Therefore, the information registered for the one-touch key must be sought from the database 170. Because the search parameter values are registered in association with a one-touch key, a search can be performed via an easy operation. Naturally, a search can be performed based on search parameter values different from the registered search parameter values.

Upon the completion of the input of the search keyword and search condition, the user instructs the LDAP server 103 to carry out an LDAP search by pressing the search start key 201-4 on the screen 201 (S12). In the example shown in the screen 201, keywords are input regarding the 'Name' and 'E-mail address' attributes, and the search condition 'contains' is selected for both. The search condition 'does not use' is selected for the 'Surname' and 'First name' attributes. During a search, information is narrowed down via AND operations based on these search parameter values.

When the search result information is subsequently received from the LDAP server 103, the search results 203-3, i.e., the e-mail addresses meeting the search parameter values, are displayed on the screen 203 (S14). This screen 203 includes a registration key 203-1 by which to register the e-mail addresses, i.e., the search results, in association with the one-touch keys.

The registration of the search results in the MFP as e-mail address information will now be described. When the user presses down the registration key 203-1 on the screen 203 to effect one-touch key registration (YES in S16), the screen 204 is displayed. This screen 204 is a registration setting screen by which to carry out registration in the database 141. The screen 204 includes multiple keys 204-1, a registration key 204-2 and one-touch keys 204-3. The keys 204-1 are keys by which to select a group for which multiple items of address information are registered. The characters registered for and displayed on the keys 204-1 may be changed. On the screen 204, when the 'MFP Development Department' key 204-1 is selected and the registration key 204-2 is pressed, all of the search results (address group) are registered as a group in association with 'MFP Development Department', and the search keywords and search conditions used for the search are also registered in the MFP database 141 as one-touch key/ 'MFP Development Department' group information (S18). The e-mail addresses comprising the results of the search are assigned to each one-touch key 204-3 for registration. The surname and/or first name of each search result is displayed on each one-touch key 204-3, for example. The search results are also displayed on the screen 206 (S20). This screen 206 is a one-touch key selection screen by which the user inputs recipients for transmission, i.e., a transmission recipient setting screen that displays recipient designation keys stored in the database 141. When the user selects any one of the one-touch keys on the one-touch key selection screen 206, the e-mail address registered in association with that one-touch key is set as the recipient. Therefore, when transmission is instructed via the operation panel, the data can be sent to the recipient corresponding to the selected recipient designation key.

By pressing down the 'MFP Development Department' key 204-1 in the screen 204 and the 'MFP Development Department' key 206-1 in the screen 206, the screen 205 is displayed, wherein the registered search keywords and search conditions are displayed. The user can verify the search keywords and search conditions on this screen 205.

Figure 6:
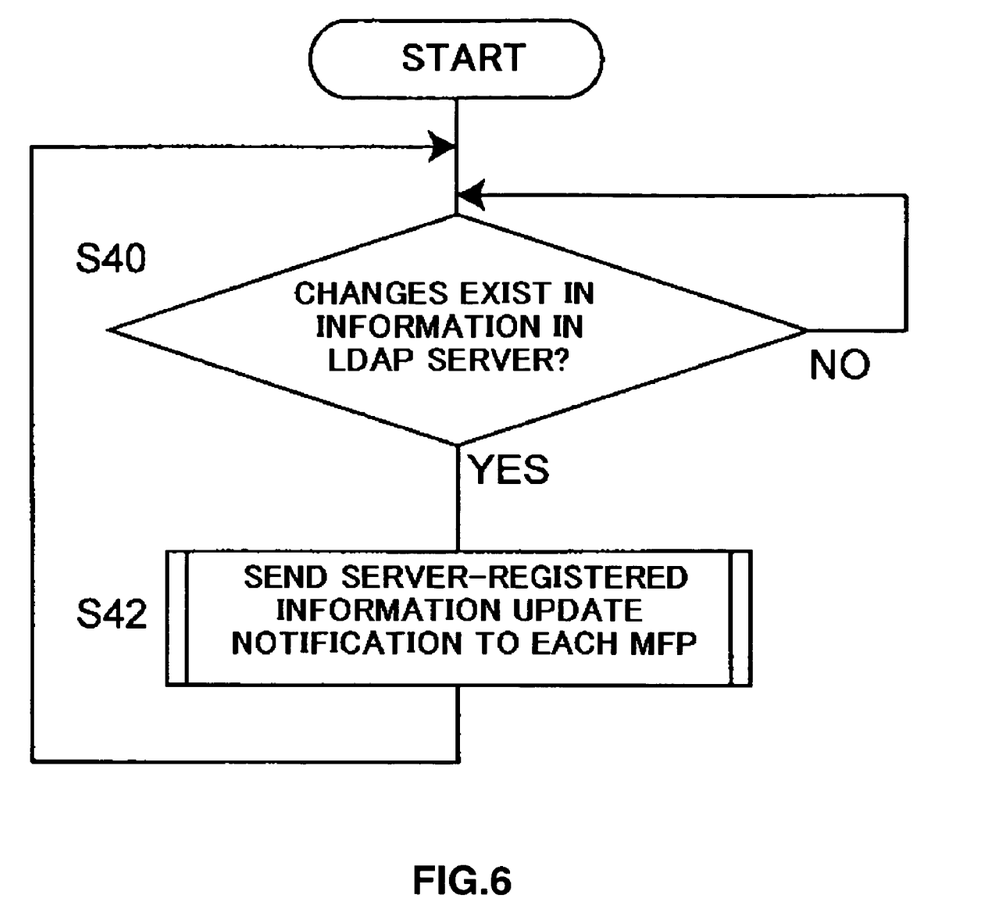
FIG. 6 is a flow chart for registration updating.

The updating of the registered information in the LDAP server 103 will now be explained. As shown in FIG. 6, where changes have occurred to the registered information stored on the LDAP server 103 (S40), the LDAP server 103 sends an update notification to all data transmission apparatuses (including the MFPs) connected to the network 101 (S42).

Figure 7:
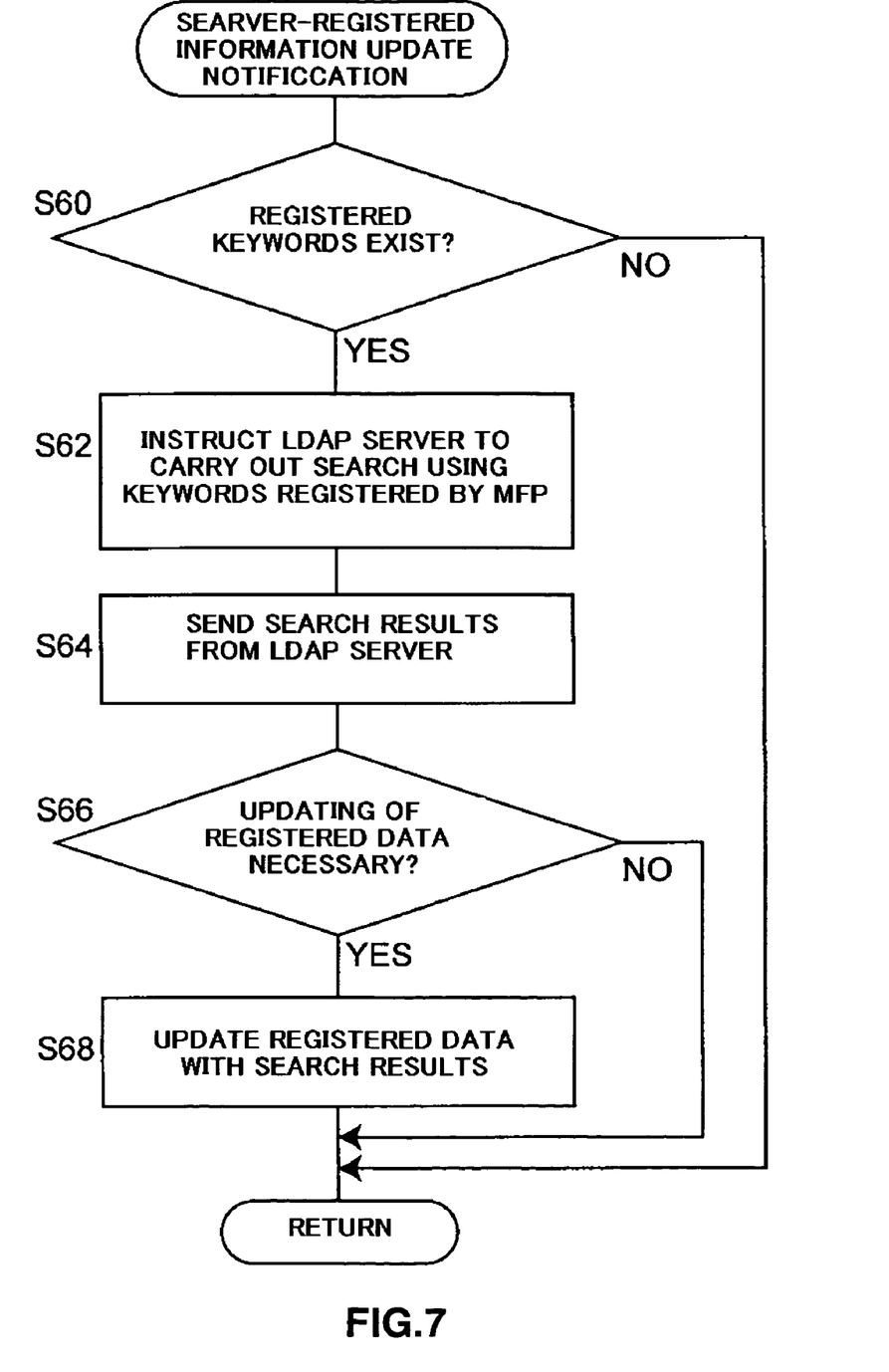
FIG. 7 is a flow chart for registered data registration updating.

When an update notification (S42 in FIG. 6) is received from the LDAP server 103, each MFP instructs the LDAP server 103 to carry out a search using the search keywords and search conditions registered for the one-touch key information and one-touch key group information, as shown in the flow chart of FIG. 7. It then receives search result information from the LDAP server 103, and updates the registered information stored thereon where appropriate. Using the information referred to above that was registered in association with 'MFP Development Department', the information registered as 'MFP Development Department' group information is replaced with the search result information received from the LDAP server 103.

To explain in more detail the control performed in each MFP when a server-registered information update notification is received, it is first determined whether or not registered keywords exist (S60). If the answer is YES, the LDAP server is instructed to carry out a search using such keywords (S62). Search results are then received from the LDAP server 103 (S64). If it is determined here that the registered data needs to be updated (YES in S66), the registered data is updated with the search results (S68). Accordingly, the information obtained via an LDAP search and registered in the MFP is updated each time the registered information in the LDAP server 103 is updated.

Figure 8:
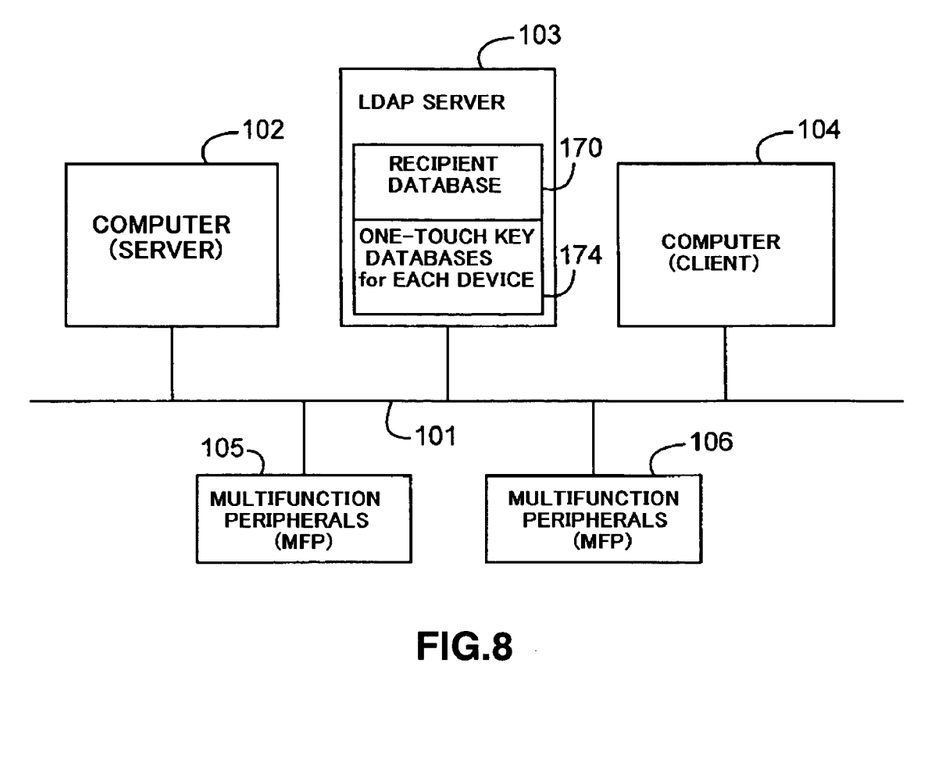
FIG. 8 is a block diagram showing the basic construction of the system of a different embodiment.
Figure 9:
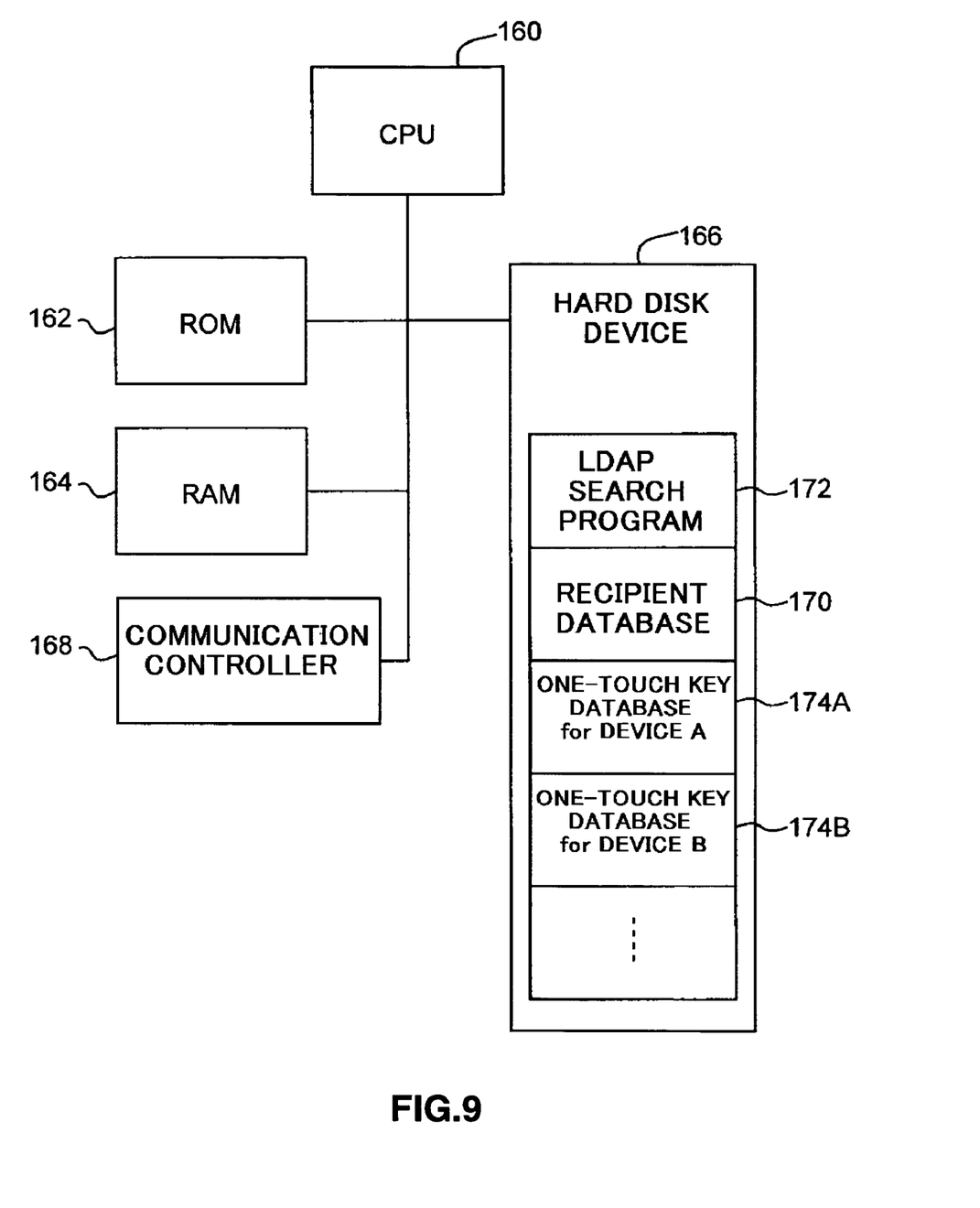
FIG. 9 is a block diagram showing the basic construction of the LDAP server of a different embodiment.

In the embodiment described above, the data transmission apparatus possessed the search function, but the LDAP server 103 may possess such function instead, as shown in FIGS. 8 and 9. In this case, the LDAP server should include, in addition to the database 170, databases (one-touch key databases) 174 for each data transmission apparatus, wherein one-touch key information and search parameter values are registered. When the database 170 is updated, the database 170 is searched using the search parameter values registered for each one-touch key in the one-touch key databases 174 for each data transmission apparatus, and the recipient information extracted as a result of the searches and the search parameter values are re-registered as recipient information assigned to each one-touch key. As a variation, it is also acceptable if search parameter values are not registered. In this case, when the recipient database 170 is updated, the information in the one-touch key databases 174 for each data transmission apparatus is updated.

While the registration of e-mail addresses was described above, the information registered in association with the one-touch keys can be updated in the same way when FAX registration numbers or the like are registered for the one-touch keys as well.

According to this embodiment, because the search parameter values in the registration server are stored when recipient information stored in association with the recipient designation keys is registered, if information is registered by department or section and personnel is added to a department or section, the same research parameter values can be used, and therefore the update operation can be carried out easily. In addition, because when the registration server is updated, an update notification is output and the transmission recipient information is updated in accordance therewith, the information in each data transmission apparatus can be kept updated.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data transmission system comprising a registration server on which recipient information is registered and a data transmission apparatus that is connected to the registration server over a network and transmits data to a recipient, the registration server comprising:
a first storage portion configured to store a first database in which information including recipient information is registered, wherein the recipient information comprises destination information to which data is to be sent,
a search portion configured to search and re-search the registered information using the same search parameter corresponding to a recipient designation key for the data transmission apparatus to obtain a first recipient information, and
a communication portion configured to output the first recipient information obtained by the search portion to the data transmission apparatus, the data transmission apparatus comprising:
a second storage portion configured to store the search parameter and a second database in which the first recipient information obtained with the search parameter is registered in association with the recipient designation key corresponding to the search parameter,
a display portion configured to display a recipient setting screen that displays the recipient designation keys stored in the second storage portion,
a transmission portion configured to transmit data to the recipient corresponding to a selected recipient designation key, and
an update portion configured to update the first recipient information stored in the second database;
wherein, when the recipient information registered in the first database is updated,
the search portion of the registration server performs a re-search of the first database based on the same search parameter as used to obtain the first recipient information and stored in the second storage portion to obtain a second recipient information,
the communication portion of the registration server sends the second recipient information obtained by the re-search by the search portion to the data transmission apparatus, and
the update portion of the data transmission apparatus updates the second database so that the first recipient information in the second database is replaced by the second recipient information and the second recipient information is registered in association with the recipient designation key.

2. The data transmission system according to claim 1, wherein the display portion of the data transmission apparatus displays a search parameter setting screen by which to set the search parameter.

3. The data transmission system according to claim 2, wherein the search parameter value storage portion is incorporated in the data transmission apparatus.

4. The data transmission system according to claim 3, wherein the registration server output an update notification from the communication portion when recipient information registered in the first database is updated.

5. The data transmission system according to claim 4, wherein the data transmission apparatus is configured to output a search instruction to the registration server instructing that the first database be re-searched using the search parameter stored in the second storage portion when the update notification is received.

6. The data transmission system according to claim 5, wherein the registration server carry out the re-search of the first database using the search parameter based on the search instruction output from the data transmission apparatus, and send to the data transmission apparatus the recipient information resulting from the re-search.

7. The data transmission system according to claim 1, wherein if a plurality of recipient information are sent from the registration server, the data transmission apparatus deem the plurality of the recipient information to represent a recipient and registers the recipient information in association with recipient designation key and store it in the second database of the second storage portion, as well as store the plurality of recipient information as recipient group information.

8. The data transmission system according to claim 7, wherein the data transmission apparatus display the recipient group information on the recipient setting screen, and when the recipient group information is selected, display the search parameter stored in the search parameter value storage portion.

9. A data transmission apparatus connected over a network to a registration server having a first storage portion configured to store a first database in which information including recipient information is registered, the recipient information comprises destination information to which data is to be sent, the data transmission apparatus comprising:
a second storage portion configured to store a search parameter storage portion including a search parameter used to search the first database and a second database including first recipient information obtained by searching the first database using the search parameter in association with a recipient designation key corresponding to the search parameter, wherein the first recipient information is obtained from a search portion of the registration server searching the recipient information stored in the first database using the search parameter;
a display portion configured to display a recipient setting screen that displays the recipient designation keys stored in the second storage portion;
a transmission portion configured to transmit data to the recipient corresponding to a selected recipient designation key; and
an update portion configured to update the first recipient information stored in the second database,
wherein, when the recipient information registered in the first database is updated, the search portion of the registration server performs a re-search of the first database based on the same search parameter as used to obtain first recipient information and stored in the second storage portion,
a communication portion of the registration server sends a second recipient information obtained by the re-search by the search portion to the data transmission apparatus, and
the update portion of the data transmission apparatus updates the second database so that the first recipient information in the second database is replaced by the second recipient information and the second recipient information is registered in association with the recipient designation key.

10. The data transmission apparatus according to claim 9, wherein when an update notification indicating that information registered in the first database is updated is received, the data transmission apparatus outputs to the registration server a search instruction instructing to re-search the database once more using the search parameter stored in the second storage portion.

11. The data transmission apparatus according to claim 10, wherein the recipient information comprising the results of a re-search output from the registration server in response to the search instruction be deemed to represent recipients and stored once more in the second database of the second storage portion.

12. A data transmission system comprising a registration server on which recipient information is registered and a data transmission apparatus that is connected to the registration server over a network and transmits data to a recipient,
the registration server comprising:
a first storage portion that stores a first database in which information including recipient information is registered, wherein the recipient information comprises destination information to which data is to be sent,
a search portion configured to search and re-search the registered information using the same search parameter corresponding to a recipient designation key for the data transmission apparatus to obtain a first recipient information,
a second storage portion configured to store the search parameter and a second database in which the first recipient information obtained by the search parameter is registered in association with the recipient designation key corresponding to the search parameter, the search parameter and a second database being related to the data transmission apparatus, and
an update portion configured to update the first recipient information stored in the second database;
the data transmission apparatus comprising:
a display portion configured to display a recipient setting screen that displays the recipient designation keys stored in the second storage portion, and
a transmission portion configured to transmit data to the recipient corresponding to a selected recipient designation key;
wherein when the recipient information registered in the first database is updated,
the search portion of the registration server performs a re-search of the first database based on the same search parameter as used to obtain the first recipient information and stored in the second storage portion to obtain a second recipient information, and
the update portion of the data transmission apparatus updates the second database so that the first recipient information in the second database is replaced by the second recipient information and the second recipient information is registered in association with the recipient designation key.

* * * * *